US009432092B2

(12) United States Patent
Xu et al.

(10) Patent No.: US 9,432,092 B2
(45) Date of Patent: Aug. 30, 2016

(54) DOWNLINK PRECODING METHOD AND DATA INTERACTING METHOD FOR COORDINATED MULTI-POINT TRANSMISSION SYSTEM AND APPARATUS

(71) Applicant: FUJITSU LIMITED, Kawasaki-shi, Kanagawa (JP)

(72) Inventors: Yueqiao Xu, Beijing (CN); Hua Zhou, Beijing (CN); Yi Wang, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 14/139,206

(22) Filed: Dec. 23, 2013

(65) Prior Publication Data
US 2014/0112295 A1   Apr. 24, 2014

Related U.S. Application Data

(63) Continuation of application No. PCT/CN2011/076617, filed on Jun. 30, 2011.

(51) Int. Cl.
*H04B 7/24*   (2006.01)
*H04B 7/02*   (2006.01)
(Continued)

(52) U.S. Cl.
CPC .............. *H04B 7/024* (2013.01); *H04B 7/063* (2013.01); *H04B 7/0632* (2013.01); *H04B 7/0639* (2013.01); *H04W 24/10* (2013.01)

(58) Field of Classification Search
None
See application file for complete search history.

(56) References Cited

U.S. PATENT DOCUMENTS

| 2010/0027471 | A1 | 2/2010 | Palanki et al. |
| 2010/0273495 | A1 | 10/2010 | Onggosanusi et al. |
| 2010/0309998 | A1* | 12/2010 | Jung ............... H04B 7/024 375/260 |

(Continued)

FOREIGN PATENT DOCUMENTS

| CN | 101557249 | 10/2009 |
| CN | 101557249 A | 10/2009 |

(Continued)

OTHER PUBLICATIONS

International search report issued for corresponding international application No. PCT/CN2011/076617, mailed Apr. 5, 2012.

(Continued)

*Primary Examiner* — Andrew Lai
*Assistant Examiner* — Jamaal Henson
(74) *Attorney, Agent, or Firm* — Myers Wolin, LLC

(57) ABSTRACT

Embodiments of the present invention provide a downlink precoding method and data interacting method for coordinated multi-point transmission system and apparatus. The downlink precoding method includes: acquiring a precoding matrix indicator by a cooperating point and determining the precoding matrix of the cooperating point according to the precoding matrix indicator, the number of columns of the precoding matrix of the cooperating point being less than that of columns of the precoding matrix of a serving point; and performing, by the cooperating point, downlink precoding to the data to be transmitted according to the determined precoding matrix of the cooperating point. With the methods and apparatuses of the embodiments of the present invention, as the cooperating points participate only in the transmission of data of part of layers in the coordinated scenarios, the complexity of calculation and the feedback overhead are lowered in the UE end.

9 Claims, 7 Drawing Sheets

(51) Int. Cl.
*H04W 24/10* (2009.01)
*H04B 7/06* (2006.01)

(56) References Cited

U.S. PATENT DOCUMENTS

2011/0028156 A1  2/2011 Zhu et al.
2013/0078913 A1* 3/2013 Lee .................. H04L 5/0007
                                                455/39

FOREIGN PATENT DOCUMENTS

| CN | 101841847 A | 9/2010 |
| CN | 101911522 A | 12/2010 |
| CN | 101951686   | 1/2011 |
| CN | 102113237 A | 6/2011 |
| EP | 2 602 944 A1 | 6/2013 |
| EP | 2602944 A1 * | 6/2013 | ............ H04B 7/024 |
| WO | 2010/087030 A1 | 8/2010 |
| WO | 2010148535 | 12/2010 |

OTHER PUBLICATIONS

Extended European search report with supplementary European search report and the European search opinion issued for corresponding European Patent Application No. 11868661.7, mailed on Feb. 12, 2015.
First Notification of Office Action and Search Report issued by the State Intellectual Property Office of China for corresponding Chinese Patent Application No. 201180066573.9, dated Oct. 19, 2015, with an English translation.
Second Notification of Office Action issued by the State Intellectual Property Office of China for corresponding Chinese Patent Application No. 201180066573.9, dated Jun. 13, 2016, with an English translation.

* cited by examiner

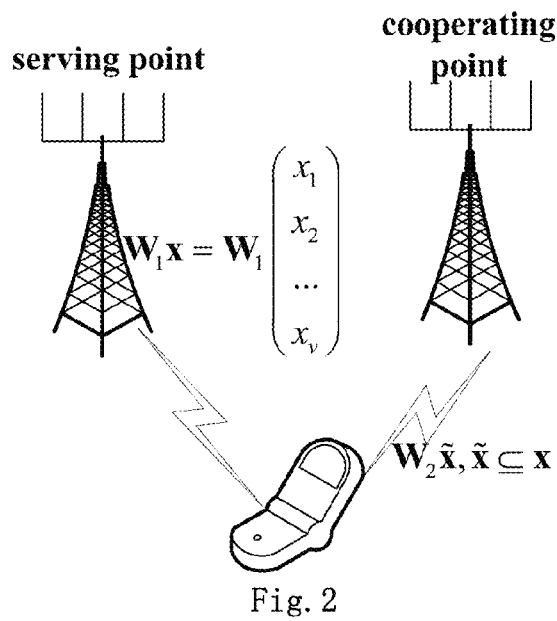

Fig. 2

| acquiring a precoding matrix indicator by the cooperating point and determining the precoding matrix of the cooperating point according to the precoding matrix indicator, the number of columns of the precoding matrix of the cooperating point being less than that of columns of the precoding matrix of the serving point | 301 |
|---|---|
| performing, by the cooperating point, downlink precoding to the data to be transmitted according to the determined precoding matrix of the cooperating point | 302 |

Fig. 3

DOWNLINK PRECODING METHOD AND DATA INTERACTING METHOD FOR COORDINATED MULTI-POINT TRANSMISSION SYSTEM AND APPARATUS

CROSS-REFERENCE TO RELATED APPLICATIONS

This is a continuation of Application PCT/CN2011/076617, filed on Jun. 30, 2011 and now pending, the contents of which are herein wholly incorporated by reference.

TECHNICAL FIELD

The present invention relates to the field of communications, and in particular to a downlink precoding method and data interacting method for coordinated multi-point transmission system and apparatus.

BACKGROUND ART

In an LTE-advanced (LTE-A) system, coordinated multi-point (CoMP) transmission is brought into the LTE-A frame work as one of the key technologies. In a coordinated transmission scenario, geographically neighboring transmission points are used to cooperatively transmit signals to user equipment. Signal quality may be improved and coverage may be expanded particularly for cell-edge users. In a CoMP scenario, coordinated transmission points (TPs) participating in data transmission may be divided into a serving point (similar to the serving cell in LTE Rel-8) and a cooperating point.

In coordinated transmission, much attention is paid to a precoding technology based on close-loop feedback. In 3GPP LTE-A standardization, a joint transmission (JT) scheme in a CoMP scenario mainly includes global precoding, MBSFN and local precoding.

As shown in FIG. 1a, the global precoding is to estimate a composite channel matrix of an serving point and cooperating point in an transmission end by user (UE, user equipment), and estimate channel state information (CSI) according to a composite channel of a relatively large dimensional space. The CSI includes a precoding matrix indicator (PMI), a channel quality indicator (CQI) and rank indication (RI). Wherein, the PMI is obtained by search in a codebook of a relatively large dimensional space, corresponding to precoding information of a composite channel. The precoding matrix of each TP in an transmission end is a sub-matrix in the precoding matrix to which the PMI corresponds. The global precoding is able to obtain an optimal coordinated transmission performance, but the UE end needs to search a codebook space of a larger dimension for calculating the precoding matrix, with a complexity in calculation. Furthermore, in such a mode, the UE needs to additionally feed back CSI of the single link from itself to the serving point, so as to support a serving mode where the UE falls back to a conventional signal cell.

As shown in FIG. 1b, the MBSFN is to transmit identical data to the UE by using identical precodes by each TP participating in the data transmission in a coordinated scenario. Such a method is simple in operation, the UE needs only to feed back one piece of precoding matrix information, the searched codebook space is small, and the overhead in feedback is less; however, the coordinated transmission performance is poor.

As shown in FIG. 1c, the local precoding is to transmit identical data to the UE by each TP participating in the data transmission by using respective independent precoding matrix in a coordinated scenario. In comparison with the global precoding and the MBSFN, such a method obtains compromised results with respect to complexity, feedback overhead and performance. In comparison with the global precoding, in feeding back PMIs of multiple single-points, the local precoding needs no extra feedback information for supporting the UE fallback mode.

In the implementation of the present invention, the inventors found that although the local precoding may obtain a compromised system performance, it strictly requires that each TP participating in coordinated transmission in the transmission end transmits data of the same layer and hence complete data interaction between an serving point and a cooperating point in the transmission end is needed. A case as follows is neglected in such conventional local precoding scheme: in data of multiple layers transmitted by the serving point, the channel quality experienced by a certain layer data (such as the 1st layer data) is obviously superior than that of another layer data (such as the 2nd layer data). In such a case, a certain layer data experiencing a better channel quality needs not to be transmitted by the cooperating point. Therefore, other cooperating points than the serving point need not to transmit data of all the layers, and may select data of part of the layers for transmission, such as selecting a layer data with worst quality for transmission.

Thus, in a CoMP transmission scenario, in the process of transmission of data of multiple layers, channel qualities experienced by data of different layers are different, and different precoding methods may be selected, so as to achieve flexible adaptive coordinated transmission in a transmission end.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a downlink precoding method and data interacting method for coordinated multi-point transmission system and apparatus, where a precoding method for transmission is selected based on an adaptive layer, so as to provide an adaptive flexible close-loop feedback precoding method in a coordinated scenario.

According to one aspect of the embodiments of the present invention, there is provided a downlink precoding method for coordinated multi-point transmission system, the coordinated multi-point transmission system including a serving point and a cooperating point, wherein the method includes:

acquiring a precoding matrix indicator by the cooperating point and determining the precoding matrix of the cooperating point according to the precoding matrix indicator, the number of columns of the precoding matrix of the cooperating point being less than that of columns of the precoding matrix of the serving point; and performing, by the cooperating point, downlink precoding to the data to be transmitted according to the determined precoding matrix of the cooperating point.

According to another aspect of the embodiments of the present invention, there is provided a data interacting method for coordinated multi-point transmission system, the coordinated multi-point transmission system including a serving point and a cooperating point, wherein the method includes:

transmitting data to user equipment by the serving point according to a determined precoding matrix of the serving point;

transmitting data needing to be transmitted by the cooperating point to the cooperating point by the serving point, the data needing to be transmitted by the cooperating point being a subset of the data transmitted by the serving point to the user equipment; and transmitting, by the cooperating point, to the user equipment the data transmitted by the serving point and needing to be transmitted by the cooperating point according to a determined precoding matrix of the cooperating point; wherein the number of columns of the precoding matrix of the cooperating point being less than that of columns of the precoding matrix of the serving point.

According to still another aspect of the embodiments of the present invention, there is provided a downlink precoding method for coordinated multi-point transmission system, wherein the method includes:

a first determining step: determining the channel state information of a serving point by user equipment according to a reference signal transmitted by the serving point, the channel state information including a precoding matrix indicator, a channel quality indicator and rank indication;

a second determining step: determining the precoding matrix of a cooperating point by the user equipment according to a reference signal transmitted by the cooperating point and the number of layers of data cooperatively transmitted by the cooperating point indicated by a predetermined policy, the number of columns of the precoding matrix of the cooperating point being less than that of columns of the precoding matrix of the serving point; and a feeding back step: feeding back by the user equipment the precoding matrix indicator of the serving point and a precoding matrix indicator of the cooperating point, the channel quality indicator and the rank indication, so that the serving point and the cooperating point perform downlink precoding to the data needing to be transmitted by them respectively according to the respective precoding matrixes.

According to a further aspect of the embodiments of the present invention, there is provided a cooperating point for coordinated multi-point transmission system, the coordinated multi-point transmission system further including a serving point, wherein the cooperating point includes:

an acquiring unit configured to acquire a precoding matrix indicator;

a determining unit configured to determine the precoding matrix of the cooperating point according to the precoding matrix indicator acquired by the acquiring unit, the number of columns of the precoding matrix of the cooperating point being less than that of columns of the precoding matrix of the serving point; and a processing unit configured to perform downlink precoding to the data to be transmitted according to the precoding matrix of the cooperating point determined by the determining unit.

According to a further aspect of the embodiments of the present invention, there is provided a coordinated multi-point transmission system, the coordinated multi-point transmission system including a serving point and a cooperating point, wherein, the serving point is used to transmit data to user equipment according to the precoding matrix of the serving point, and transmit the data needing to be transmitted by the cooperating point to the cooperating point, wherein the data needing to be transmitted by the cooperating point is a subset of the data transmitted by the serving point to the user equipment; and the cooperating point is used to transmit to the user equipment the data transmitted by the serving point and needing to be transmitted by the cooperating point according to the precoding matrix of the cooperating point, wherein the number of columns of the precoding matrix of the cooperating point is less than that of columns of the precoding matrix of the serving point.

According to a further aspect of the embodiments of the present invention, there is provided user equipment, wherein the user equipment includes:

a first determining unit configured to determine the channel state information of a serving point according to a reference signal transmitted by the serving point, the channel state information including a precoding matrix indicator, a channel quality indicator and rank indication;

a second determining unit configured to determine the precoding matrix of a cooperating point according to a reference signal transmitted by the cooperating point and the number of layers of data cooperatively transmitted by the cooperating point indicated by a predetermined policy, the number of columns of the precoding matrix of the cooperating point being less than that of columns of the precoding matrix of the serving point; and a feeding back unit configured to feed back the precoding matrix indicator of the serving point, a precoding matrix indicator of the cooperating point, the channel quality indicator and the rank indication, so that the serving point and the cooperating point perform downlink precoding to the data needing to be transmitted by them respectively according to the respective precoding matrixes.

According to a further aspect of the embodiments of the present invention, there is provided a computer-readable program, wherein when the program is executed in a base station, the program enables a computer to carry out the downlink precoding method for coordinated multi-point transmission system as described above in the base station.

According to a further aspect of the embodiments of the present invention, there is provided a storage medium in which a computer-readable program is stored, wherein the computer-readable program enables a computer to carry out the downlink precoding method for coordinated multi-point transmission system as described above in a base station.

According to a further aspect of the embodiments of the present invention, there is provided a computer-readable program, wherein when the program is executed in user equipment, the program enables a computer to carry out the downlink precoding method as described above in the user equipment.

According to a further aspect of the embodiments of the present invention, there is provided a storage medium in which a computer-readable program is stored, wherein the computer-readable program enables a computer to carry out the downlink precoding method as described above in user equipment.

The advantage of the embodiments of the present invention exist in that with the methods and apparatus of the embodiments of the present invention, the cooperating points participating in the coordinated transmission in a coordinated scenario participate in the transmission of data of part of layers, thereby lowering the complexity of calculation and the feedback overhead in the UE end.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings:

FIG. 2 is a schematic diagram of an adaptive rank cooperated local precoding scheme of an embodiment of the present invention;

FIG. 3 is a flowchart of a downlink precoding method of a cooperating point of an embodiment of the present invention;

DETAILED DESCRIPTION OF THE INVENTION

Figure 1A:
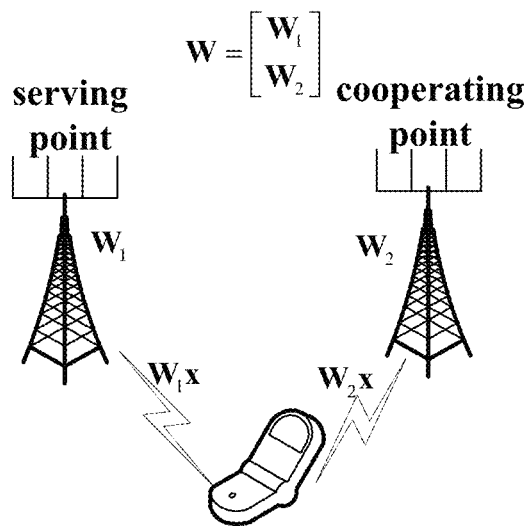
FIG. 1a is a schematic diagram of a precoding scheme of a global precoding scheme.
Figure 1B:
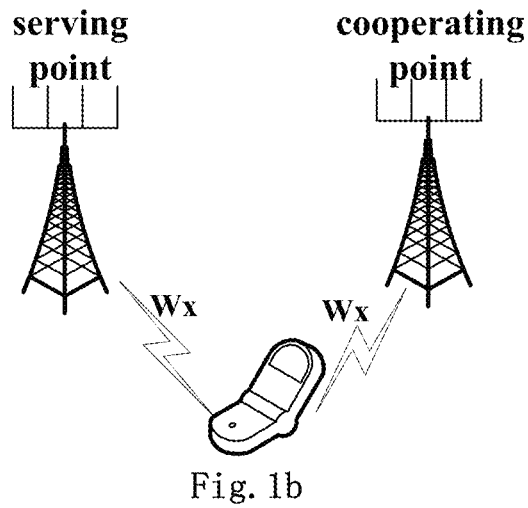
FIG. 1b is a schematic diagram of a precoding scheme of an MBSFN precoding scheme.
Figure 1C:
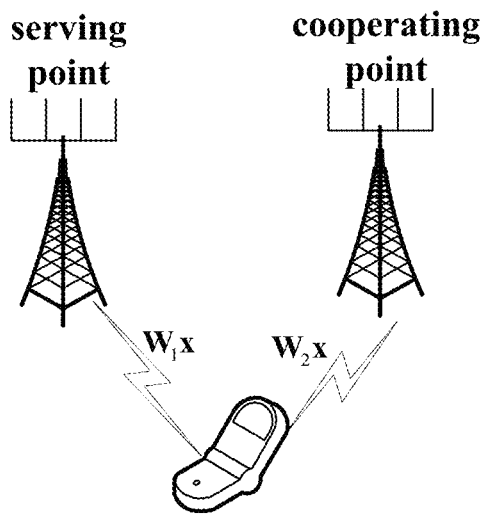
FIG. 1c is a schematic diagram of a precoding scheme of a local precoding scheme.

The foregoing and other features of the embodiments of the present invention will become apparent with reference to the drawings and the following description. These embodiments are illustrative only and are not intended to limit the present invention. For easy understanding of the principle and embodiments of the present invention by those persons skilled in the art, the embodiments of the present invention shall be described taking that a serving point and a cooperating point in a CoMP transmission system provide services to user equipment as an example. However, it should be appreciated that the embodiments of the present invention are not limited to said system, and is applicable to other systems relating to CoMP, as well as to a case of a CoMP transmission system where multiple cooperating points and a serving point provide services to user equipment.

FIG. 2 is a schematic diagram of an adaptive rank cooperated local precoding scheme of a CoMP transmission system of an embodiment of the present invention. Referring to FIG. 2, in the CoMP transmission system, a serving point and a cooperating point are included, the serving point being a serving base station, and the cooperating point being a cooperating base station, both of the serving base station and the cooperating base station jointly providing services to user equipment.

Referring still to FIG. 2, the precoding matrix of the serving base station is $W_1$, and the data transmitted by the serving base station is x, x including $x_1, x_2, \ldots x_v$. The precoding matrix of the cooperating base station is $W_2$, and data $\tilde{x}$ transmitted by the cooperating base station is a subset of the data x transmitted by the serving base station, that is, $\tilde{x} \subseteq x$. In this embodiment, the number of the columns of the precoding matrix $W_2$ of the cooperating base station is less than that of the columns of the precoding matrix $W_1$ of the serving base station, thereby ensuring that the data transmitted by the cooperating base station in cooperation is a subset of the data transmitted by the serving base station.

In this embodiment, the cooperating points participating in the coordinated transmission in the coordinated scenario participate in the transmission of the data of part of layers only, thereby lowering the complexity of calculation and the feedback overhead in the UE end.

Embodiment 1

FIG. 3 is a flowchart of a downlink precoding method in a CoMP transmission system provided by an embodiment of the present invention, the CoMP transmission system of this embodiment including a serving point and a cooperating point. Referring to FIG. 3, the method includes:

step 301: acquiring a precoding matrix indicator by the cooperating point and determining the precoding matrix of the cooperating point according to the precoding matrix indicator, the number of columns of the precoding matrix of the cooperating point being less than that of columns of the precoding matrix of the serving point; and step 302: performing, by the cooperating point, downlink precoding to the data to be transmitted according to the determined precoding matrix of the cooperating point.

In step 301, the cooperating point may obtain the precoding matrix indicator of the cooperating point from the serving point, and may also obtain the precoding matrix indicator of the cooperating point from user equipment, and this embodiment is not limited thereto. Wherein, the precoding matrix to which the precoding matrix indicator of the cooperating point corresponds may be selected by the user equipment by traversing candidate precoding matrixes in the codebooks of part of layers of all the antennas of the cooperating point according to a reference signal transmitted by the cooperating point, and may also be otherwise determined by the user equipment. Detailed method of selection or determination shall be described in the following embodiment.

In step 302, after the cooperating point determines the precoding matrix of itself, as the number of columns of the precoding matrix is less than that of columns of the precoding matrix of the serving point, the cooperating point performs downlink precoding to the data to be transmitted according to the precoding matrix of itself, and hence performs transmission of corresponding data. The data to be transmitted is transmitted by the serving point to the cooperating point, and is a subset of the data transmitted by the serving point to the user equipment. In comparison with the prior art where the serving point transmits all the data transmitted by it to the cooperating point so that the cooperating point participates in the transmission of all the data, the cooperating point of this embodiment only participates in the transmission of data of part of layers.

In this embodiment, as the cooperating point only participates in the transmission of data of part of layers, the complexity of calculation and the feedback overhead in the UE end are lowered.

Embodiment 2

Figure 4:
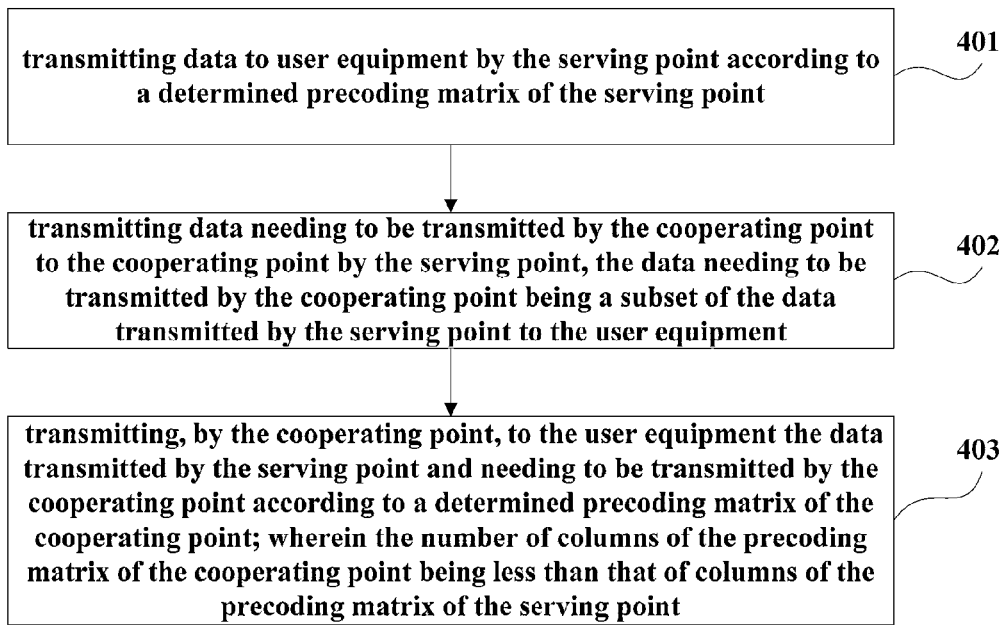
FIG. 4 is a flowchart of a data interacting method of an embodiment of the present invention.

FIG. 4 is a flowchart of a data interacting method in a CoMP transmission system provided by an embodiment of the present invention, the CoMP transmission system of this embodiment including a serving point and a cooperating point. Referring to FIG. 4, the method includes:

step 401: transmitting data to user equipment by the serving point according to a determined precoding matrix of the serving point;

step 402: transmitting data needing to be transmitted by the cooperating point to the cooperating point by the serving point, the data needing to be transmitted by the cooperating point being a subset of the data transmitted by the serving point to the user equipment; and step 403: transmitting, by the cooperating point, to the user equipment the data transmitted by the serving point and needing to be transmitted by the cooperating point according to a determined precoding matrix of the cooperating point; wherein the number of columns of the precoding matrix of the cooperating point being less than that of columns of the precoding matrix of the serving point.

In step 401, the precoding matrix of the serving point may be determined by the user equipment by traversing candidate precoding matrixes in the codebooks of part of layers of all the antennas of the serving point according to a reference signal transmitted by the serving point, and may also be otherwise determined by the user equipment, and this embodiment is not limited thereto. After determining the precoding matrix of the serving point, the user equipment feeds the precoding matrix of the serving point back to the serving point, and details shall be described in the following embodiment.

In step 401, the serving point performs downlink precoding to the data to be transmitted to the user equipment according to the precoding matrix of the serving point fed back by the user equipment, and hence performs transmission of the data.

In step 402, the serving point transmits data of the layers needing to be cooperated by the cooperating point for transmission to the cooperating point according to a predetermined policy. Wherein, the predetermined policy may be an agreement made by the serving point, the cooperating point and the user equipment on cooperating transmission of data by the cooperating point. For example, the predetermined policy may be that the cooperating point is needed to transmit in cooperation data of a predetermined number of layers with worst channel qualities, the predetermined number of layers may be 1 or 2. Wherein, the channel qualities experienced by the data of different layers may be fed back via CQI or MCS by the user equipment in feeding the precoding matrix of the serving point back to the serving point, so that the serving point knows the data of which layers experience worst channel qualities, and selects corresponding data to transmit to the cooperating point according to said predetermined policy.

In step 402, the data needing to be transmitted by the cooperating point is a subset of the data transmitted by the serving point to the user equipment, that is, the cooperating point only participates in the coordinated transmission of data of part of the layers.

In step 403, the cooperating point may acquire and determine the precoding matrix of the cooperating point in the manner shown in FIG. 3, the number of columns of the precoding matrix of the cooperating point being less than that of columns of the precoding matrix of the serving point. The cooperating point performs downlink precoding to the data transmitted by the serving point according to the precoding matrix of the cooperating point, and hence performs coordinated transmission of data of the part of the layers. The manner of determining the precoding matrix of the cooperating point by the cooperating point is the same as that shown in FIG. 3, which shall not be described herein any further.

In this embodiment, as the cooperating point only participates in the transmission of data of part of layers, the complexity of calculation and the feedback overhead in the UE end are lowered.

Embodiment 3

Figure 5:
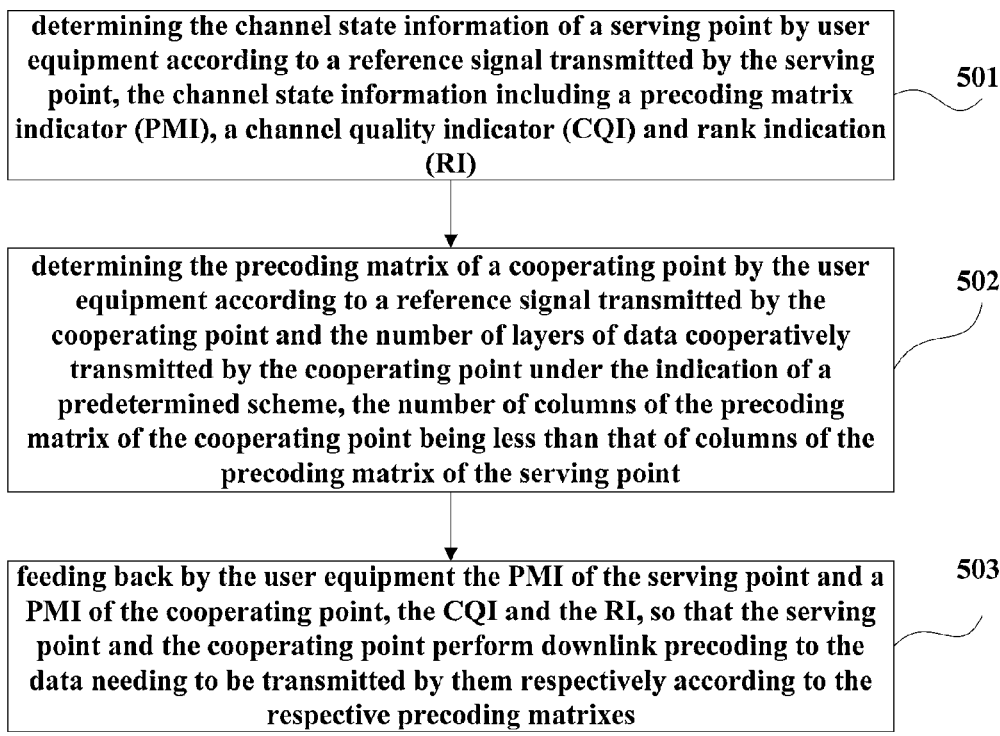
FIG. 5 is a flowchart of a downlink precoding method of user equipment of an embodiment of the present invention.

FIG. 5 is a flowchart of a downlink precoding method in a CoMP transmission system provided by an embodiment of the present invention, the CoMP transmission system of this embodiment including a serving point and a cooperating point. Referring to FIG. 5, the method includes:

step 501 (a first determining step): determining the channel state information of a serving point by user equipment according to a reference signal transmitted by the serving point, the channel state information including a precoding matrix indicator (PMI), a channel quality indicator (CQI) and rank indication (RI);

step 502 (a second determining step): determining the precoding matrix of a cooperating point by the user equipment according to a reference signal transmitted by the cooperating point and the number of layers of data cooperatively transmitted by the cooperating point indicated by a predetermined policy, the number of columns of the precoding matrix of the cooperating point being less than that of columns of the precoding matrix of the serving point; and step 503 (a feeding back step): feeding back by the user equipment the PMI of the serving point and a PMI of the cooperating point, the CQI and the RI, so that the serving point and the cooperating point perform downlink precoding to the data needing to be transmitted by them respectively according to the respective precoding matrixes.

In step 501, the user equipment estimates a channel ($H_1$) from the serving point to the user equipment according to a reference signal transmitted by the serving point first, and then traverses candidate precoding matrixes in all the codebooks of all the layers of all the antennas of the serving point to select the precoding matrix ($W_1$) of the serving point therefrom, determines a precoding matrix indicator ($PMI_1$) according to the precoding matrix ($W_1$), and determines a channel quality indicator (CQI) and rank indication (RI) according to the channel ($H_1$).

After step 501, the user equipment knows the channel quality experienced by the data of each layer transmitted by the serving point to it according the estimated CQI, and may feed back the CQI to the serving point, and the serving point knows the data of the number of layers needing to be cooperated by the cooperating point for transmission according to the CQI and a predetermined policy, for example, the cooperating point is needed by the serving point to cooperate in transmitting the data of the second layer, and the serving point transmits the data of that layer to the cooperating point; and the user equipment may also feed back the CQI to the cooperating point, and after receiving the fed back CQI information, the cooperating point knows the data of the number of layers needed by the cooperating point to cooperate in transmission with the serving point. Wherein, the predetermined policy is the same as that described above, which shall not be described herein any further.

In step 502, the user equipment estimates a channel ($H_2$) from the cooperating point to the user equipment according to a reference signal transmitted by the cooperating point first, and then traverses all the candidate precoding matrixes in the codebooks of a number of layers of all the transmission antennas of the cooperating point according to the number of layers of the data transmitted with the cooperation of the cooperating point indicated in a predetermined policy, and determines the precoding matrix ($W_2$) of the cooperating point according to the channel ($H_2$) from the cooperating point to the user equipment, and may determine the precoding matrix indicator ($PMI_2$) of the cooperating point according to the precoding matrix ($W_2$).

In step 502, the precoding matrix of the cooperating point may be selected in a manner of joint calculation, and may also be selected in a manner of separate calculation; however, this embodiment is not limited thereto, and any manner capable of determining a precoding matrix of a cooperating point is covered by the protection scope of the present invention.

Wherein, the selection of the precoding matrix of the cooperating point in the manner of joint calculation may be on the premise of fixed precoding matrix $W_1$ of the serving point, traversing each precoding matrix in a corresponding codebook space and taking it as the precoding matrix of the cooperating point, and selecting the precoding matrix of the cooperating point in a manner based on performance metrics (such as total throughput, and block error ratio (BLER), etc.) and taking $H_1$ and $H_2$ into consideration. For example, performance metrics of each matrix in a codebook is respectively calculated according to the channel state information $H_1$ and $H_2$ of the serving point and the cooperating point, so as to determine the precoding matrix of the cooperating point. The selection of the precoding matrix of the cooperating point in the manner of separate calculation may be traversing each precoding matrix in a codebook space and taking it as the precoding matrix of the cooperating point, and selecting the precoding matrix of the cooperating point in a manner based on performance metrics (such as maximum total throughput and minimum block error ratio (BLER)) and only taking the channel state information $H_2$ of the cooperating point into consideration.

In step 502, the number of layers of the data transmitted with the cooperation of the cooperating point indicated in the predetermined policy may be a fixed value, for example, it may be fixed as 1 layer or 2 layers; and may also be dynamically adjusted by the user equipment according to the estimated channel quality experienced by the data transmitted by the serving point. Wherein, if the value is fixed, as the predetermined policy is negotiated by the serving point, the cooperating point and the user equipment, the number of layers is known to these three parties. Wherein, if the number of layers is dynamically adjusted, the user equipment will negotiate with the serving point and the cooperating point after determining the number of layers, such as transmitting the determined number of layers to the serving point and the cooperating point, so that both of the serving point and the cooperating point know the number of layers of the data needing to be transmitted with the cooperation of the cooperating point.

In step 503, after determining a precoding matrix of the serving point and a precoding matrix of the cooperating point, the user equipment may feed back a PMI of the serving point and a PMI of the cooperating point, as well as a CQI and RI, to the originating transmission point, so that the serving point, according to its precoding matrix, performs downlink precoding to a data to be transmitted, performs the transmission of the data, and transmits a data needing to be transmitted with the cooperation of the cooperating point to the cooperating point according to the CQI and said predetermined policy, and the cooperating point performs downlink precoding to the data according to its precoding matrix, and performs the transmission of the data.

Wherein, the user equipment may feed back all the above information to the serving point, and then the serving point forwards the PMI of the cooperating point to the cooperating point; and the user equipment may also feed the PMI, CQI and RI of the serving point back to the serving point, and feed the PMI of the cooperating point back to the cooperating point.

According to another implementation of the embodiment, before step 503, the user equipment may also calculate a index of layer number of the data transmitted by the cooperating point and a phase shift between the data transmitted by the cooperating point and the data of the corresponding layer transmitted by the serving point according to the precoding matrix ($W_1$) of the serving point and the precoding matrix ($W_2$) of the cooperating point, and then redetermine a CQI and RI according to the phase shift. Hence, at this time, the information fed back by the user equipment in step 501 includes information of the phase shift and the redetermined CQI and RI, in addition to the PMI of the serving point and the PMI of the cooperating point.

In this embodiment, the user equipment determines the precoding matrix of the serving point first, and then determines the precoding matrix of the cooperating point according to a predetermined policy, the number of columns of the precoding matrix of the cooperating point being less than that of columns of the precoding matrix of the serving point; thereafter, the user equipment feeds back the precoding matrix of the serving point, the precoding matrix of the cooperating point, the CQI and the RI; the serving point performs downlink precoding to the data transmitted to the user equipment according to its precoding matrix, and transmits the data needing to be transmitted with the cooperation of the cooperating point to the cooperating point according to a predetermined policy and the CQI fed back by the user equipment, the data needing to be transmitted with the cooperation of the cooperating point being a subset of the data transmitted by the serving point to the user equipment; and the cooperating point performs downlink precoding to the data transmitted by the serving point and needing to be transmitted with the cooperation of the cooperating point according to its precoding matrix. With the method of this embodiment, as the cooperating point only participates in the transmission of data of part of layers, the complexity of calculation and the feedback overhead are lowered in the UE end.

For clarity and easy understanding of the embodiment shown in FIG. 5, the downlink precoding method of this embodiment shall be described below taking that the serving point has 4 transmitting antennas, the cooperating point has 4 transmitting antennas and the user equipment has 2 receiving antennas as an example.

Figure 6:
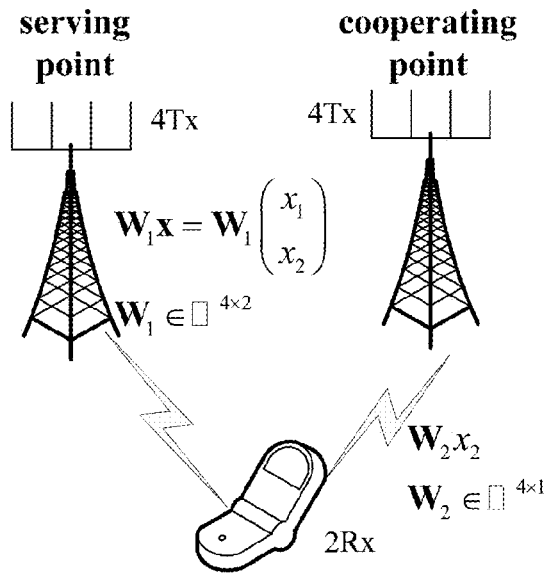
FIG. 6 is a schematic diagram of an application of a coordinated multi-point transmission system of an embodiment of the present invention.
Figure 7:
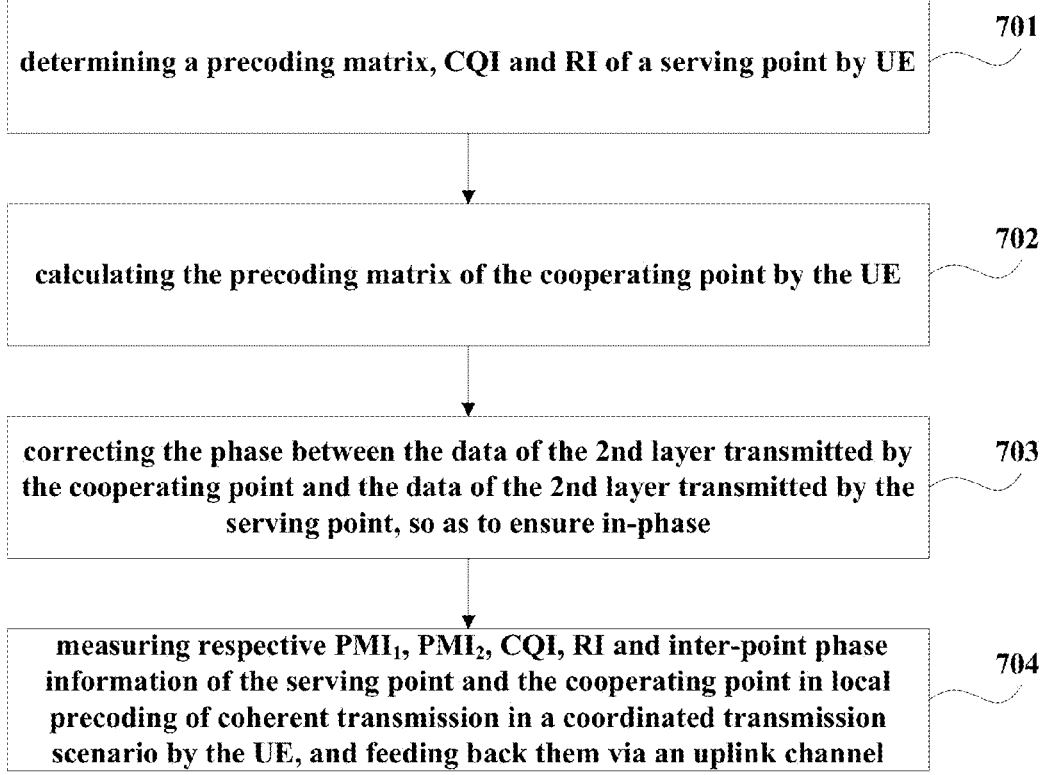
FIG. 7 is a flowchart of a downlink precoding method in the scenario shown in FIG. 6.

FIG. 6 is a schematic diagram of a coordinated multi-point transmission system in such a scenario, and FIG. 7 is a flowchart of a downlink precoding method in such a scenario. Referring to FIG. 6, a downlink coordinated transmission point includes a serving point and a cooperating point, each point having 4 transmitting antennas (4Tx) and the user equipment having 2 receiving antennas (2Rx). Hence, the data transmitted by the serving point are $$W_1 x = W_1 \begin{pmatrix} x_1 \\ x_2 \end{pmatrix},$$

where, $W_1 \in C^{4\times 2}$. In this embodiment, the channel quality experienced by the data $x_2$ is worst, and the predetermined policy is that the cooperating point cooperates in the transmission of the data of the layer with the worst channel quality; thus the cooperating point cooperates in the transmission of $x_2$, and the data transmitted by the cooperating point are $W_2 x_2$, where, $W_2 \in C^{4\times 1}$. In this embodiment, the number of the columns of $W_2$ is less than that of the columns of $W_1$, and $x_2$ is a subset of x.

Referring to FIG. 7, the method comprises:

step 701: determining a precoding matrix, CQI and RI of a serving point by UE;

wherein, the UE estimates channel $H_1$ from the serving point to the UE according an RS transmitted by the serving point, and then determines the precoding matrix $W_1$ (4×2 dimensions), CQI and RI, of the serving point, by traversing candidate precoding matrixes (including matrixes of 1 layer, 2 layers, 3 layers and 4 layers) of all the codebooks of the 4 transmitting antennas of the serving point; in this example, data of 2 layers are transmitted, RI=2, and the CQI is denoted by an MCS, being modulation and coding schemes of 2 layers of data;

wherein, as the predetermined policy is that the cooperating point cooperates in the transmission of the data of one layer with the worst channel quality, the precoding matrix of the cooperating point is 4×1 dimensions; and as the user equipment learns the MCSs of the two layers served by the serving point in a single-point manner according to the above estimation and hence learns that the channel quality experienced by the data of the 2nd layer is poor, the cooperating point is needed to cooperate in the transmission of the data of the 2nd layer;

step 702: calculating the precoding matrix of the cooperating point by the UE;

wherein, the UE estimates channel $H_2$ from the cooperating point to the UE according an RS transmitted by the cooperating point, and as the predetermined policy is that the cooperating point cooperates in the transmission of the data of one layer with the worst channel quality, determines the precoding matrix $W_2$ (4×1 dimensions) of the cooperating point by traversing all the candidate precoding matrixes in codebooks of one layer of the 4 transmitting antennas of the cooperating point;

wherein, $W_2$ may be determined by the UE in a manner of joint calculation, and may also be determined in a manner of separate calculation; however, this embodiment is not limited thereto, and any manner capable of determining $W_2$ is applicable to the present invention; wherein, in the manner of joint calculation, the selected precoding matrix $W_2$ of the cooperating point may be determined by calculating respectively the performance metrics of each matrix in the codebook based on selection of performance metrics (such as maximum total throughput, and minimum block error ratio (BLER), etc.) and taking CSI of $H_1$ and $H_2$ of the serving point and the cooperating point into consideration; and wherein, in the manner of separate calculation, the selected precoding matrix $W_2$ of the cooperating point may be determined by traversing each precoding matrix in the codebook and calculating respectively the performance metrics of each matrix in the codebook only according to CSI of $H_2$ of the cooperating point;

step 703: correcting the phase between the data of the 2nd layer transmitted by the cooperating point and the data of the 2nd layer transmitted by the serving point, so as to ensure in-phase;

wherein, 4PSK (4 phase shift keying) co-phasing can be used to fix precoding matrixes $W_1$ and $W_2$ of the serving point and the cooperating point to select the phase shift between the data of the 2nd layer transmitted by the two transmission points, and to redetermine the MCS; the above description is given taking that 4PSK is used for phase correction as an example; however, the embodiment of the present invention is not limited thereto; for example, BPSK (binary phase shift keying) and 16PSK (16 phase shift keying), etc., may also be used for phase correction, which shall not be described herein any further;

step 704: measuring respective $PMI_1$, $PMI_2$, CQI (reflected by an MCS), RI and inter-point phase information of the serving point and the cooperating point in local precoding of coherent transmission in a coordinated transmission scenario by the UE, and feeding back them via an uplink channel;

in this embodiment, the expression of the downlink signal obtained in the above manner is:

$$y = H_1 W_1 x + H_2 W_2 e^{j\varphi} x_2 + n$$

$$= H_1 W_1 \begin{pmatrix} x_1 \\ x_2 \end{pmatrix} + H_2 \begin{pmatrix} 0 & W_2 \end{pmatrix} \begin{pmatrix} 1 & \\ & e^{j\varphi} \end{pmatrix} \begin{pmatrix} x_1 \\ x_2 \end{pmatrix} + n;$$

where, the serving point transmits data x1 and x2 of 2 layers, and the cooperating point transmits the data of the 2nd layer; and if it is coherent transmission in the transmission end, the two transmission points (the serving point and the cooperating point) need a phase compensation factor $\phi$ in transmitting the data of the 2nd layer, so as to correct the phase between the data of the 2nd layer of the two transmission points and ensure in-phase;

wherein, this embodiment is given taking that the data transmitted by the cooperating point is the data of the worst layer of all the layers as an example; however, this embodiment is not limited hereto, and the data transmitted by the cooperating point may be a subset of the data of all the layers transmitted by the serving point, that is, the number v2 of layers of data transmitted by the cooperating point is less than the number v1 of layers of data transmitted by the serving point; the subset (i.e. the value of v2) may be determined as the worst layer of all the layers of the data transmitted by the serving point, and may also be two worst layers of all the layers of the data transmitted by the serving point.

In this embodiment, if no coherent transmission is performed by the two transmission points, that is, the serving point and the cooperating point perform non-coherent local precoding, and the cooperating point transmits data of the layer with worst channel quality, the process of measuring the CSI by the UE is similar to what is described above, with the exception that step 703 may be omitted, that is, no phase correction is performed to the data of the 2nd layer transmitted by the cooperating point and the data of the same layer transmitted by the serving point.

Hence, according to this embodiment, the expression of the downlink signal received by the UE end is:

$$y = H_1 W_1 x + H_2 W_2 x_2 + n$$
$$= H_1 W_1 \begin{pmatrix} x_1 \\ x_2 \end{pmatrix} + H_2 (0 \quad W_2) \begin{pmatrix} x_1 \\ x_2 \end{pmatrix} + n.$$

An embodiment of the present invention further provides a cooperating point for coordinated multi-point transmission system, as described in embodiment 4 below. As the principle of the cooperation point for solving problems is similar to that of the method of Embodiment 1, the implementation of the method of Embodiment 1 may be referred to for the implementation of the cooperation point, and the repeated parts shall not be described any further.

Embodiment 4

Figure 8:
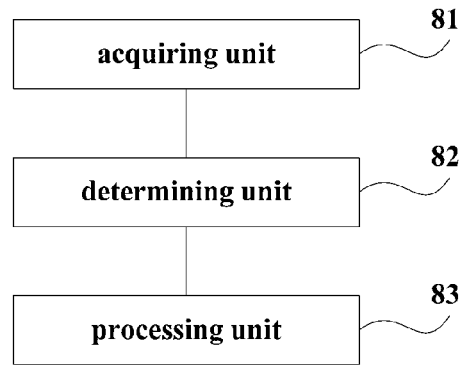
FIG. 8 is a schematic diagram of a cooperating point of an embodiment of the present invention.

FIG. 8 is a schematic diagram of a cooperating point for coordinated multi-point transmission system provided by this embodiment. As shown in FIG. 8, the cooperating point includes:

an acquiring unit 81 configured to acquire a precoding matrix indicator;

a determining unit 82 configured to determine the precoding matrix of the cooperating point according to the precoding matrix indicator acquired by the acquiring unit 81, the number of columns of the precoding matrix of the cooperating point being less than that of columns of the precoding matrix of the serving point; and a processing unit 83 configured to perform downlink precoding to the data to be transmitted according to the precoding matrix of the cooperating point determined by the determining unit 82.

With the cooperating point of this embodiment, as the cooperating point may cooperate with the serving point in the transmission of data of part of layers, the complexity of calculation and the feedback overhead are lowered in the UE end.

An embodiment of the present invention further provides a coordinated multi-point transmission system, as described in embodiment 5 below. As the principle of the coordinated multi-point transmission system for solving problems is similar to that of the method of Embodiment 2, the implementation of the method of Embodiment 2 may be referred to for the implementation of the coordinated multi-point transmission system, and the repeated parts shall not be described any further.

Embodiment 5

Figure 9:
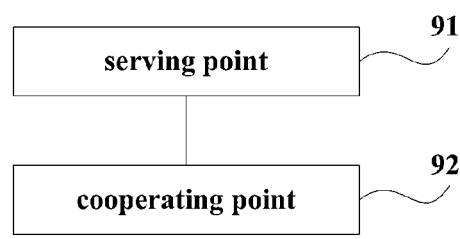
FIG. 9 is a schematic diagram of a coordinated multi-point transmission system of an embodiment of the present invention.

FIG. 9 is a schematic diagram of the coordinated multi-point transmission system provided by this embodiment. Referring to FIG. 9, the coordinated multi-point transmission system includes a serving point 91 and a cooperating point 92; wherein, the serving point 91 is used to transmit data to user equipment according to the precoding matrix of the serving point, and transmit the data needing to be transmitted by the cooperating point to the cooperating point, wherein the data needing to be transmitted by the cooperating point is a subset of the data transmitted by the serving point to the user equipment; and the cooperating point 92 is used to transmit to the user equipment the data transmitted by the serving point and needing to be transmitted by the cooperating point according to the precoding matrix of the cooperating point, wherein the number of columns of the precoding matrix of the cooperating point is less than that of columns of the precoding matrix of the serving point.

With the coordinated multi-point transmission system of this embodiment, as the cooperating point may cooperate with the serving point in the transmission of data of part of layers, the complexity of calculation and the feedback overhead are lowered in the UE end.

An embodiment of the present invention further provides user equipment, as described in embodiment 6 below. As the principle of the user equipment for solving problems is similar to that of the method of Embodiment 3, the implementation of the method of Embodiment 3 may be referred to for the implementation of the user equipment, and the repeated parts shall not be described any further.

Embodiment 6

Figure 10:
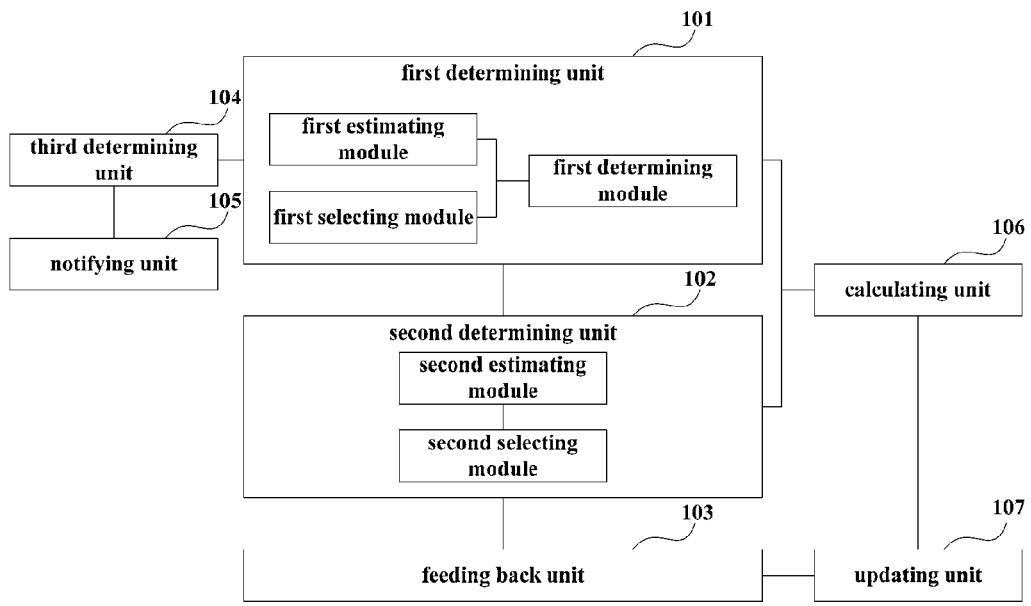
FIG. 10 is a schematic diagram of user equipment of an embodiment of the present invention.

FIG. 10 is a schematic diagram of the user equipment provided by this embodiment. Referring to FIG. 10, the user equipment includes:

a first determining unit 101 configured to determine the channel state information of a serving point according to a reference signal transmitted by the serving point, the channel state information including a precoding matrix indicator, a channel quality indicator and rank indication;

a second determining unit 102 configured to determine the precoding matrix of a cooperating point according to a reference signal transmitted by the cooperating point and the number of layers of data cooperatively transmitted by the cooperating point indicated by a predetermined policy, the number of columns of the precoding matrix of the cooperating point being less than that of columns of the precoding matrix of the serving point; and a feeding back unit 103 configured to feed back the precoding matrix indicator of the serving point, a precoding matrix indicator of the cooperating point, the channel quality indicator and the rank indication, so that the serving point and the cooperating point perform downlink precoding to the data needing to be transmitted by them respectively according to the respective precoding matrixes.

In an embodiment, the user equipment further comprises:

a third determining unit 104 configured to determine the channel quality experienced by the data of each layer transmitted by the serving point according to the channel quality indicator determined by the first determining unit 101; and a notifying unit 105 configured to notify the layer index(es) of data needing to be transmitted by the cooperating point to the serving point according to the channel quality experienced by the data of all layers transmitted by the serving point, the number of layers of data predetermined to be transmitted by the cooperating point and a predetermined selection policy, so that the serving point transmits the data corresponding to the layer index(es) and needing to be transmitted by the cooperating point to the cooperating point.

In an embodiment, the first determining unit 101 includes:

a first estimating module 1011 configured to estimate a channel from the serving point to the user equipment according to a reference signal transmitted by the serving point;

a first selecting module 1012 configured to select the precoding matrix of the serving point from candidate precoding matrixes in the codebooks of all the layers of all the transmission antennas of the serving point by traversing the candidate precoding matrixes; and a first determining module 1013 configured to determine the channel quality indicator and the rank indication according to the channel from the serving point to the user equipment determined by the first estimating module 1011, and to determine the precoding matrix indicator of the serving point according to the precoding matrix of the serving point selected by the first selecting module 1012.

In an embodiment, the second determining unit 102 comprises:

a second estimating module 1021 configured to estimate a channel from the cooperating point to the user equipment according to a reference signal transmitted by the cooperating point; and a second selecting module 1022 configured to traverse all the candidate precoding matrixes in the codebooks of a number of layers of all the transmission antennas of the cooperating point according to the number of layers of data cooperatively transmitted by the cooperating point indicated by the predetermined policy, and to select the precoding matrix of the cooperating point according to the channel from the cooperating point to the user equipment determined by the second estimating module 1021.

Wherein in an implementation, the second selecting module 1022 is used to traverse each precoding matrix in the corresponding codebook according to the channel state information $H_1$ and $H_2$ of the serving point and the cooperating point, and to calculate respectively the performance metrics of each precoding matrix in the codebook, so as to decide and select the precoding matrix to be used by the cooperating point.

Wherein in another implementation, the second selecting module 1022 is used to traverse each precoding matrix in the corresponding codebook according to the channel state information $H_2$ of the cooperating point, and to calculate respectively the performance metrics of each precoding matrix in the codebook, so as to decide and select the precoding matrix to be used by the cooperating point.

In an embodiment, the feeding back unit 103 is used to: feed back to the serving point the precoding matrix indicator of the serving point and the precoding matrix indicator of the cooperating point, the channel quality indicator and the rank indication, so that the serving point transmits the precoding matrix indicator of the cooperating point to the cooperating point.

In another embodiment, the feeding back unit 103 is used to: feed back to the serving point the precoding matrix indicator of the serving point, the channel quality indicator and the rank indication, and to feed back to the cooperating point the precoding matrix indicator of the cooperating point.

In an embodiment, the user equipment may further include:

a calculating unit 106 configured to calculate the phase shift of the data transmitted by the cooperating point with respect to the data of corresponding layer transmitted by the serving point according to the precoding matrix of the serving point and the precoding matrix of the cooperating point; and an updating unit 107 configured to redetermine the channel quality indicator and the rank indication according to the phase shift.

In this embodiment, the feeding back unit 103 is used to feed back the precoding matrix indicator of the serving point, the precoding matrix indicator of the cooperating point, the phase shift information obtained by the calculating unit 106, and the channel quality indicator and rank indication redetermined by the updating unit 107.

With the user equipment of this embodiment, as the cooperating point may cooperate with the serving point in the transmission of data of part of layers, the complexity of calculation and the feedback overhead are lowered in the UE end.

An embodiment of the present invention further provides a computer-readable program, wherein when the program is executed in a base station, the program enables a computer to carry out the downlink precoding method for coordinated multi-point transmission system as described in Embodiment 1 in the base station.

An embodiment of the present invention further provides a storage medium in which a computer-readable program is stored, wherein the computer-readable program enables a computer to carry out the downlink precoding method for coordinated multi-point transmission system as described in Embodiment 1 in a base station.

An embodiment of the present invention further provides a computer-readable program, wherein when the program is executed in user equipment, the program enables a computer to carry out the downlink precoding method as described in Embodiment 3 in the user equipment.

An embodiment of the present invention further provides a storage medium in which a computer-readable program is stored, wherein the computer-readable program enables a computer to carry out the downlink precoding method as described in Embodiment 3 in user equipment.

The embodiments of the present invention are described in detail taking the coordinated scenario shown in FIG. 2 as an example. However, it should be understood that the embodiments of the present invention are not limited to the above coordinated scenario, and are applicable to any other coordinated transmission system.

Figure 11A:
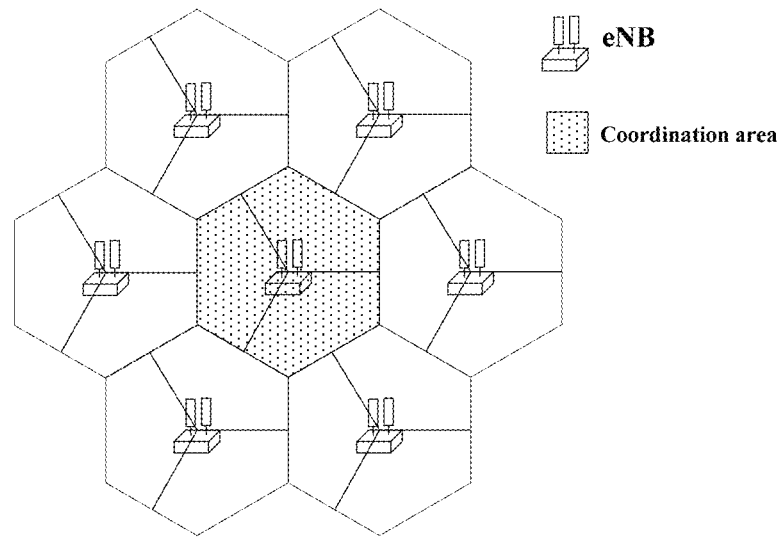
FIGS. 11a-11d are schematic diagrams of several other coordinated scenarios of applications of the methods of the embodiments of the present invention.
Figure 11B:
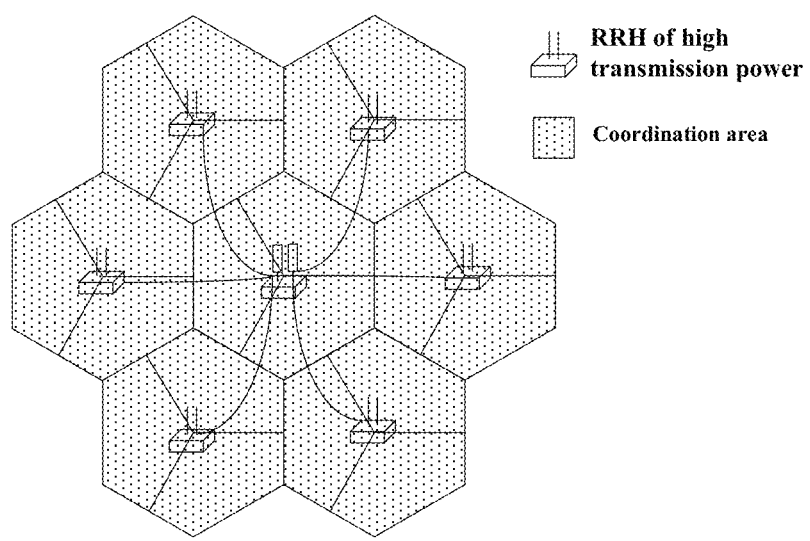
Figure 11C:
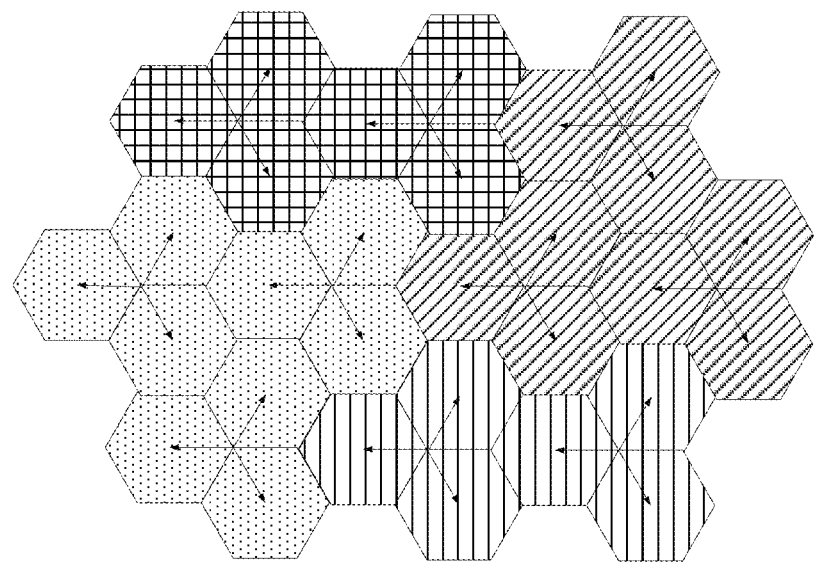
Figure 11D:
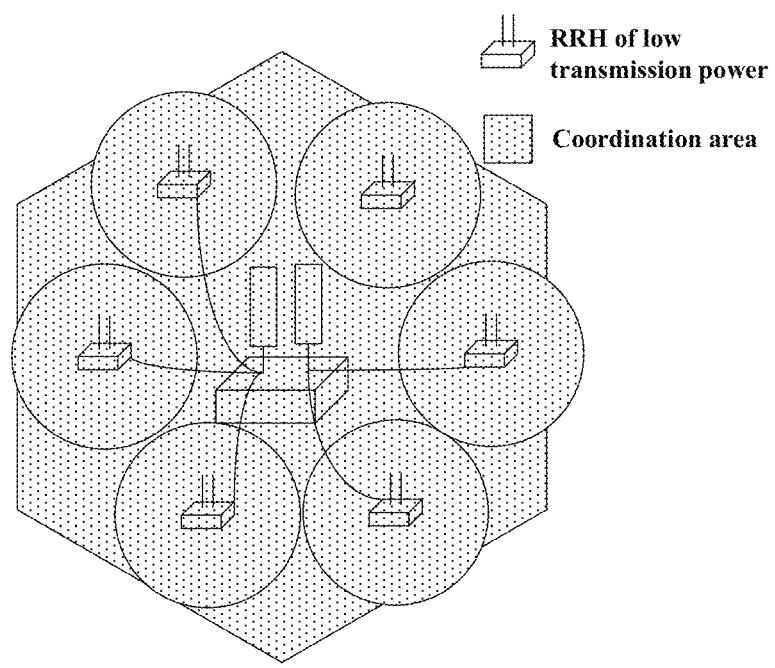

FIGS. 11*a*-11*d* are schematic diagrams of several other coordinated scenarios of applications of the methods of the embodiments of the present invention. Wherein, FIG. 11*a* is a CoMP scenario 1—CoMP scenario within an eNB, that is, multiple sectors in the coverage of an eNB cooperate to serve for certain user equipment; FIG. 11b is a CoMP scenario 2—a homogeneous network having RRH (remote radio head) of high transmission power, that is, there exist multiple RRHs of high transmission power in the coverage of an eNB, which constitute a CoMP scenario to serve for certain user equipment; FIG. 11c is an exemplary diagram of the CoMP scenario 2; and FIG. 11d is CoMP scenarios 3/4—a schematic diagram of a heterogeneous network having RRH of low transmission power, in which an eNB cooperates with multiple RRHs to serve for certain user equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A data interacting method for coordinated multi-point transmission system, the coordinated multi-point transmission system comprising a serving point and a cooperating point, wherein the method comprises:
    transmitting data to a user equipment by the serving point according to a determined precoding matrix of the serving point;
    transmitting, by the serving point to the cooperating point, data needing to be transmitted by the cooperating point according to an agreement made by the serving point, the cooperating point and the user equipment on cooperating transmission of data by the cooperating point, the data needing to be transmitted by the cooperating point being a subset of the data transmitted by the serving point to the user equipment;
    transmitting, by the cooperating point, to the user equipment the data transmitted by the serving point and needing to be transmitted by the cooperating point according to a determined precoding matrix of the cooperating point; wherein the number of columns of the precoding matrix of the cooperating point being less than that of columns of the precoding matrix of the serving point; and
    receiving, by the serving point, layer index(es) of data needing to be transmitted by the cooperating point according to channel quality experienced by the data of all layers transmitted by the serving point, the number of layers of data predetermined to be transmitted by the cooperating point and a predetermined selection policy, so that the serving point transmits the data corresponding to the layer index(es) and needing to be transmitted by the cooperating point to the cooperating point, wherein the channel quality experienced by the data of each layer transmitted by the serving point is determined according to a channel quality indicator determined by the user equipment.

2. A cooperating point for coordinated multi-point transmission system, the coordinated multi-point transmission system further comprising a serving point, wherein the cooperating point for coordinated multi-point transmission system comprises:
    processing circuitry configured to
    acquire a precoding matrix indicator;
    determine the precoding matrix of the cooperating point according to the acquired precoding matrix indicator, the number of columns of the precoding matrix of the cooperating point being less than that of columns of the precoding matrix of the serving point;
    perform downlink precoding to the data to be transmitted according to the determined precoding matrix of the cooperating point; and
    receive, from the serving point, data corresponding to layer index(es) and needing to be transmitted by the cooperating point, wherein the layer index(es) of the data needing to be transmitted by the cooperating point are notified by the user equipment to the serving point according to the channel quality experienced by the data of all layers transmitted by the serving point, the number of layers of data predetermined to be transmitted by the cooperating point and a predetermined selection policy, wherein the channel quality experienced by the data of each layer transmitted by the serving point is determined according to a channel quality indicator determined by the user equipment.

3. User equipment, wherein the user equipment comprises:
    processing circuitry and memory configured to:
    determine the channel state information of a serving point according to a reference signal transmitted by the serving point, the channel state information comprising a precoding matrix indicator, a channel quality indicator and rank indication;
    determine the precoding matrix of a cooperating point according to a reference signal transmitted by the cooperating point and the number of layers of data cooperatively transmitted by the cooperating point indicated by a predetermined policy, the number of columns of the precoding matrix of the cooperating point being less than that of columns of the precoding matrix of the serving point; and
    cause the user equipment to feed back the precoding matrix indicator of the serving point, a precoding matrix indicator of the cooperating point, the channel quality indicator and the rank indication, so that the serving point and the cooperating point perform downlink precoding to the data needing to be transmitted by them respectively according to the respective precoding matrixes;
    determine the channel quality experienced by the data of each layer transmitted by the serving point according to the determined channel quality indicator; and
    cause the user equipment to notify the layer index(es) of data needing to be transmitted by the cooperating point to the serving point according to the channel quality experienced by the data of all layers transmitted by the serving point, the number of layers of data predetermined to be transmitted by the cooperating point and a predetermined selection policy, so that the serving point transmits the data corresponding to the layer index(es) and needing to be transmitted by the cooperating point to the cooperating point.

4. The user equipment according to claim 3, wherein the processing circuitry and memory is configured to:
   estimate a channel from the serving point to the user equipment according to a reference signal transmitted by the serving point;
   select the precoding matrix of the serving point from candidate precoding matrixes in the codebooks of all the layers of all the transmission antennas of the serving point by traversing the candidate precoding matrixes; and
   determine the channel quality indicator and the rank indication according to the estimated channel from the serving point to the user equipment, and to determine the precoding matrix indicator of the serving point according to the selected precoding matrix of the serving point.

5. The user equipment according to claim 3, wherein the processing circuitry and memory is configured to:
   estimate a channel from the cooperating point to the user equipment according to a reference signal transmitted by the cooperating point; and
   traverse all the candidate precoding matrixes in the codebooks of a number of layers of all the transmission antennas of the cooperating point according to the number of layers of data cooperatively transmitted by the cooperating point indicated by the predetermined policy, and to select the precoding matrix of the cooperating point according to the estimated channel from the cooperating point to the user equipment.

6. The user equipment according to claim 5, wherein the processing circuitry and memory is configured to: traverse each precoding matrix in the corresponding codebook according to the channel state information of the serving point and the cooperating point, and to calculate respectively the performance metrics of each precoding matrix in the codebook, so as to decide and select the precoding matrix to be used by the cooperating point.

7. The user equipment according to claim 5, wherein the processing circuitry and memory is configured to: traverse each precoding matrix in the corresponding codebook according to the channel state information of the cooperating point, and to calculate respectively the performance metrics of each precoding matrix in the codebook, so as to decide and select the precoding matrix to be used by the cooperating point.

8. The user equipment according to claim 3, wherein processing circuitry and memory is configured to cause the user equipment to:
   feed back to the serving point the precoding matrix indicator of the serving point and the precoding matrix indicator of the cooperating point, the channel quality indicator and the rank indication, so that the serving point transmits the precoding matrix indicator of the cooperating point to the cooperating point; or
   feed back to the serving point the precoding matrix indicator of the serving point, the channel quality indicator and the rank indication, and to feed back to the cooperating point the precoding matrix indicator of the cooperating point.

9. The user equipment according to claim 3, wherein the processing circuitry and memory is configured to:
   calculate the phase shift of the data transmitted by the cooperating point with respect to the data of corresponding layer transmitted by the serving point according to the precoding matrix of the serving point and the precoding matrix of the cooperating point; and
   redetermine the channel quality indicator and the rank indication according to the phase shift; and
   cause the user equipment to feed back the precoding matrix indicator of the serving point, the precoding matrix indicator of the cooperating point, the calculated phase shift information, and redetermined the channel quality indicator and rank indication.

* * * * *